Aug. 13, 1963 E. J. ZEITLIN 3,100,621
VALVE WITH PARTICULARLY PACKED VALVE STEM
Filed Jan. 15, 1962
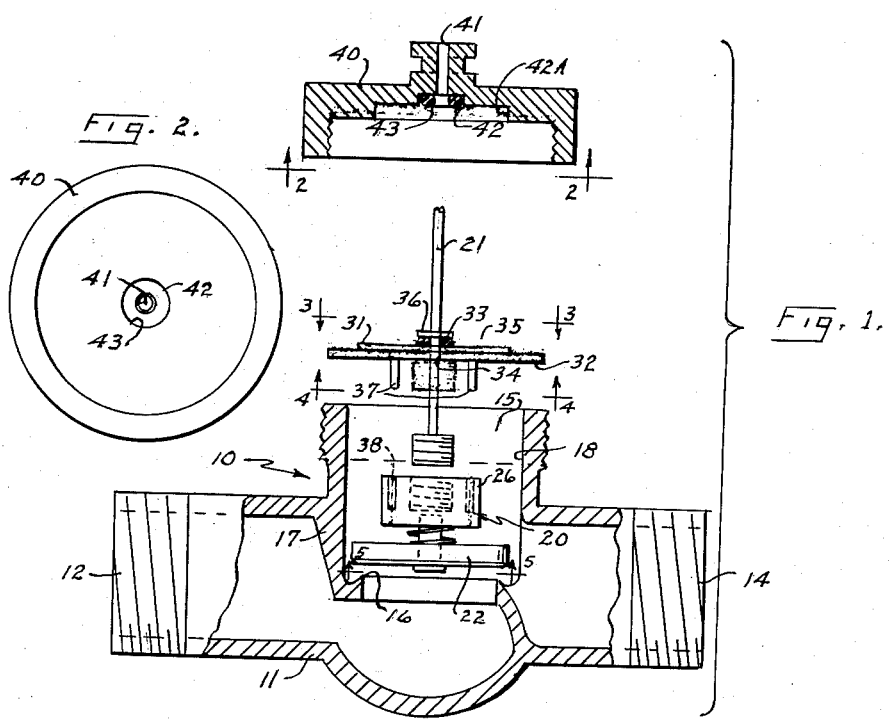
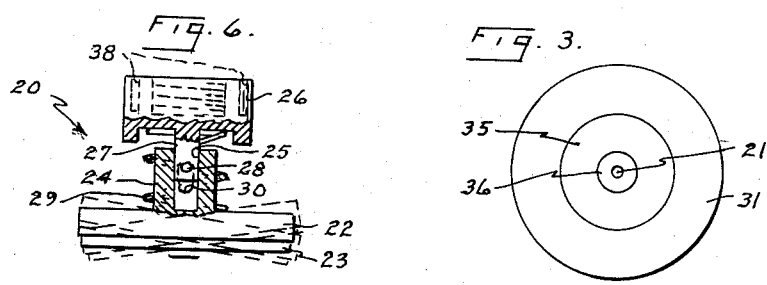
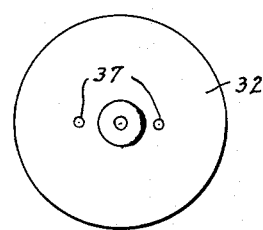
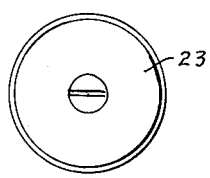
INVENTOR.
EDWARD J. ZEITLIN
BY
*Howard J. Jeandron*
AGENT

# United States Patent Office 3,100,621
Patented Aug. 13, 1963

3,100,621
VALVE WITH PARTICULARLY PACKED VALVE STEM
Edward J. Zeitlin, Purdy, N.Y., assignor to Heat Timer Corporation, New York, N.Y.
Filed Jan. 15, 1962, Ser. No. 166,253
1 Claim. (Cl. 251—214)

This invention relates to valves and more particularly to the means of constructing the valve to make it easy to disassemble and the means to prevent leakage between the valve body and its reciprocable stem.

One object of this invention is the provision of an improved sealing means to prevent leakage between the interior of the valve body and the stem.

A further object is to provide a poppet valve that is retained or connected to the valve stem by a resilient means to allow a universal movement of the poppet when it is seated upon the valve seat.

A still further object is to provide a reciprocatable valve stem that is threadably affixed to the poppet valve and easily adjustable to the desired length.

Further objects will be apparent by reference to the accompanying detailed description and the drawings in which FIG. 1 illustrates an exploded view of the valve shown partially in cross section, FIG. 2 is a plan view taken on line 2—2 of FIG. 1, FIG. 3 is a plan view taken on line 3—3 of FIG. 1, FIG. 4 is a plan view taken on line 4—4 of FIG. 1, FIG. 5 is a plan view taken on line 5—5 of FIG. 1, and FIG. 6 is an enlarged detail view of the valve poppet and mounting means.

Referring to the drawings and particularly FIG. 1 there is illustrated an exploded view of a poppet valve 10 which includes a valve body or housing 11, the housing being provided with an inlet port 12, an outlet port 14 and a valve mounting port 15. Within the valve body there is a valve seat 16 in alignment with the valve port 15. The valve seat is positioned upon the dividing wall 17. The valve port 15 has a circular bore 18 in which the poppet valve is mounted. The poppet valve comprises a valve element 20 mounted to a valve stem 21. The valve element 20, FIG. 6, comprises a flat valve head 22 with a Teflon washer 23 mounted on its face and retained by a screw or holding element and cemented to the face to retain it in the position as illustrated. The head 22 has a projection 24 on the opposite side with a central bore 25. A differential mounting element 26 provided with a stub shaft 27 extends into the bore 25 and is retained within the bore by a pin 28. A spring 29 is mounted between the head 22 and the differential mounting element 26. The projection 24 is provided with an oval shaped aperture 30. Thus the valve head although moved into or out of engagement with the valve seat 16 by element 26 will have a degree of differential movement to adjust itself to a perfect seating with the valve seat 16. Element 26 is in turn threadably secured to the end of the valve stem 21, the end of valve stem 21 being threaded to mount into element 26. To insure a perfect sealing of the valve stem with relation to the valve chamber, there is provided a disc element 32 with an aperture 34 through which the valve stem 21 extends. The upperside of element 31 is provided with a diaphragm washer 31. There is also provided a Teflon O ring 33 on the upper surface of diaphragm 31 surrounding the stem 21. Stem 21 is provided with a collar 36 to retain the O ring in juxtaposition to the diaphragm 31. On the undersurface of element 32 there are two pins 37 that align with and fit into a pair of apertures 38, FIG. 1, to retain element 26 in a fixed position. Thus, any turning of stem 21 will not rotate element 26. A cap 40 is provided with a central aperture 41. Cap 40 is provided with an internal thread to mate with the external thread of the valve port 15 for mounting the cap. Surrounding aperture 41 on the undersurface of cap 40 there is a cutout portion 42 and a large cutout portion 42A. An O ring 43 is mounted in cutout portion 42 to surround the valve stem 21 when it is mounted through the aperture 41. The diaphragm 31 will bear against the underside of cap 40 but due to the cutout portion 42A, the diaphragm 31 can flex upward. Diaphragm 31 will thus press and distort the O ring 33 that is retained by collar 36 and will urge the collar 36 into contact with O ring 43, thus providing a tight seal about stem 21. Stem 21 is moved downward by a cam (not shown) and as the cam rotates to relieve pressure on stem 21, the fluid pressure within the valve will lift the poppet valve element 20 and in turn the valve stem 21. It is apparent that in this instance there must be a very exact adjustment of the length of the valve stem 21 to insure a perfect closing and allow a sufficient opening of the valve. Cap 40 may be threadably secured to port 15 and thus will retain the closure element 32 and allow reciprocal movement of stem 21 while retaining a seal about stem 21. Thus with the valve in its assembled position it is easily disassembled; also valve stem 21 may be rotated to increase or decrease the length of stem 21. The length must be adjusted as stem 21 at its opposite end is normally operated by a cam and the adjustment must be exact to produce the desired opening and closing of the poppet valve.

Various changes may be made in the valve, that is, valve head 22 may be also provided with a cone shaped surface to seat with a different type of valve seat where required or the threadably adjustable valve stem may be dispensed with where the adjustment is not required or the complete poppet valve structure may be mounted in any other type valve chamber as long as the valve seat is positioned in a similar position without departing from the spirit of this invention and this nvention shall be limited only by the appended claim.

What is claimed is:

In a valve, the combination of a valve body having a valve seat, a valve arranged within said body, a stem for actuating said valve, a bonnet through which said stem projects, said bonnet having an annular groove on its lower surface, and a first O ring seal mounted in said groove and surrounding said stem, said bonnet cutout on its lower surface to form a chamber, said stem having an annular collar to abut with said first O ring, a second O ring arranged to surround said stem and abut said collar on the opposite side of said collar, a diaphragm engaging said second O ring, and an annular disc mounted about said stem, the periphery of said disc being arranged between said body and bonnet and said disc supporting said diaphragm providing means for maintaining said second O ring in engagement with said annular collar and said stem.

References Cited in the file of this patent
UNITED STATES PATENTS 273,839 Hennessy _____ Mar. 13, 1833
3,030,068 Priese _____ Apr. 17, 1962